United States Patent
Suciu et al.

(10) Patent No.: US 8,192,143 B2
(45) Date of Patent: Jun. 5, 2012

(54) GEARBOX ASSEMBLY

(75) Inventors: Gabriel L Suciu, Glastonbury, CT (US); Brian D. Merry, Andover, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1277 days.

(21) Appl. No.: 12/154,200

(22) Filed: May 21, 2008

(65) Prior Publication Data

US 2009/0290976 A1    Nov. 26, 2009

(51) Int. Cl.
*F01D 15/12*    (2006.01)
(52) U.S. Cl. .................. 415/108; 415/124.1; 415/213.1
(58) Field of Classification Search .................. 415/108, 415/124.1, 213.1
See application file for complete search history.

(56) References Cited

U.S. PATENT DOCUMENTS

| | | | |
|---|---|---|---|
| 2,687,860 A * | 8/1954 | McNitt ......................... 248/555 |
| 2,803,943 A * | 8/1957 | Rainbow ......................... 60/262 |
| 2,978,869 A * | 4/1961 | Hiscock et al. .................. 60/802 |
| 3,830,058 A * | 8/1974 | Ainsworth .................. 415/213.1 |
| 4,566,269 A | 1/1986 | Gingras |
| 4,629,042 A | 12/1986 | Gaus et al. |
| 4,640,153 A | 2/1987 | Brogdon et al. |
| 4,715,244 A | 12/1987 | Byrd et al. |
| 4,779,413 A | 10/1988 | Mouton |
| 5,018,601 A | 5/1991 | Waddington et al. |
| 5,319,920 A | 6/1994 | Taylor |
| 6,170,252 B1 | 1/2001 | Van Duyn |
| 6,357,220 B1 | 3/2002 | Snyder et al. |
| 6,364,249 B1 | 4/2002 | Morgan et al. |
| 6,735,954 B2 * | 5/2004 | MacFarlane et al. ........... 60/793 |
| 7,055,330 B2 | 6/2006 | Miller |
| 2005/0166570 A1 | 8/2005 | Granitz et al. |
| 2006/0056958 A1 | 3/2006 | Gaines et al. |
| 2006/0248900 A1 | 11/2006 | Suciu et al. |
| 2007/0240415 A1 | 10/2007 | Julien et al. |

* cited by examiner

*Primary Examiner* — Igor Kershteyn
(74) *Attorney, Agent, or Firm* — Kinney & Lange, P.A.

(57) ABSTRACT

An assembly for a gas turbine engine includes an intermediate case and a gearbox. The intermediate case defines an annular transition duct. The gearbox comprises a plurality of lobes and is integrally formed with the annular transition duct.

23 Claims, 5 Drawing Sheets

GEARBOX ASSEMBLY

BACKGROUND

The present invention relates to gearboxes, and more particularly to gearboxes for use in gas turbine engines.

In some gas turbine engines, an intermediate case is utilized between compressor stages, such as between a high-pressure compressor (HPC) stage and a low-pressure compressor (LPC) stage. Additionally, a gearbox is typically used for powering auxiliary components, such as generators and oil pumps, for example. The conventional gearbox has a single lobe, limiting the location of all accessories mounted on the gearbox to approximately the same location. Conventionally, such gearboxes are connected to a horizontally extending lay shaft, which is connected to a vertically extending tower shaft, which in turn is connected to and rotated by a compressor shaft. Such gearboxes are typically located toward the aft of the gas turbine engine, requiring a long lay shaft adding weight to the engine. Moreover, locating a gearbox near the aft of the engine exposes the gearbox to a relatively high temperature environment and further crowds an already crowded section of a typical gas turbine engine.

SUMMARY

According to the present invention an assembly for a gas turbine engine includes an intermediate case and a gearbox. The intermediate case defines an annular transition duct. The gearbox comprises a plurality of lobes and is integrally formed with the annular transition duct.

DETAILED DESCRIPTION

In general, the present invention provides an intermediate case assembly for a gas turbine engine that combines a gearbox with a transition duct. The gearbox is integrally formed and shares a wall with the transition duct creating a relatively low weight assembly. The gearbox has multiple lobes creating a relatively stiff gearbox structure. The multiple lobes allow accessories to be mounted at locations optimized for each accessory's function. A compressor shaft powers one tower shaft per lobe to power accessories mounted to each lobe without the need for lay shafts. Fluid can flow from one lobe to another through a connection passage.

Figure 1:
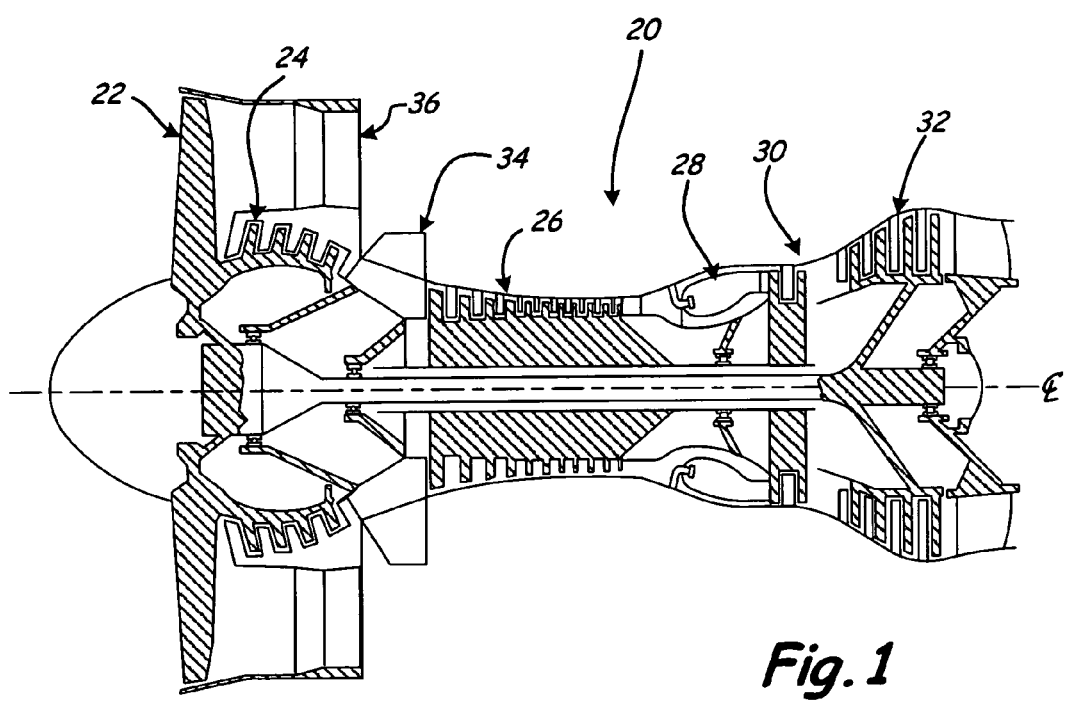
FIG. 1 is a schematic cross-sectional view of a gas turbine engine.

FIG. 1 is a schematic cross-sectional view of an exemplary two-spool gas turbine engine 20. Engine 20 includes fan 22, low-pressure compressor (LPC) section 24, high-pressure compressor (HPC) section 26, combustor assembly 28, high-pressure turbine (HPT) section 30, low-pressure turbine (LPT) section 32, intermediate case assembly 34, and bypass duct 36 all arranged about engine centerline $C_L$. The general construction and operation of gas turbine engines is well-known in the art, and therefore further discussion here is unnecessary. It should be noted, however, that engine 20 is shown in FIG. 1 merely by way of example and not limitation. The present invention is also applicable to a variety of other gas turbine engine configurations such as a turboprop engine, for example.

Figure 2:
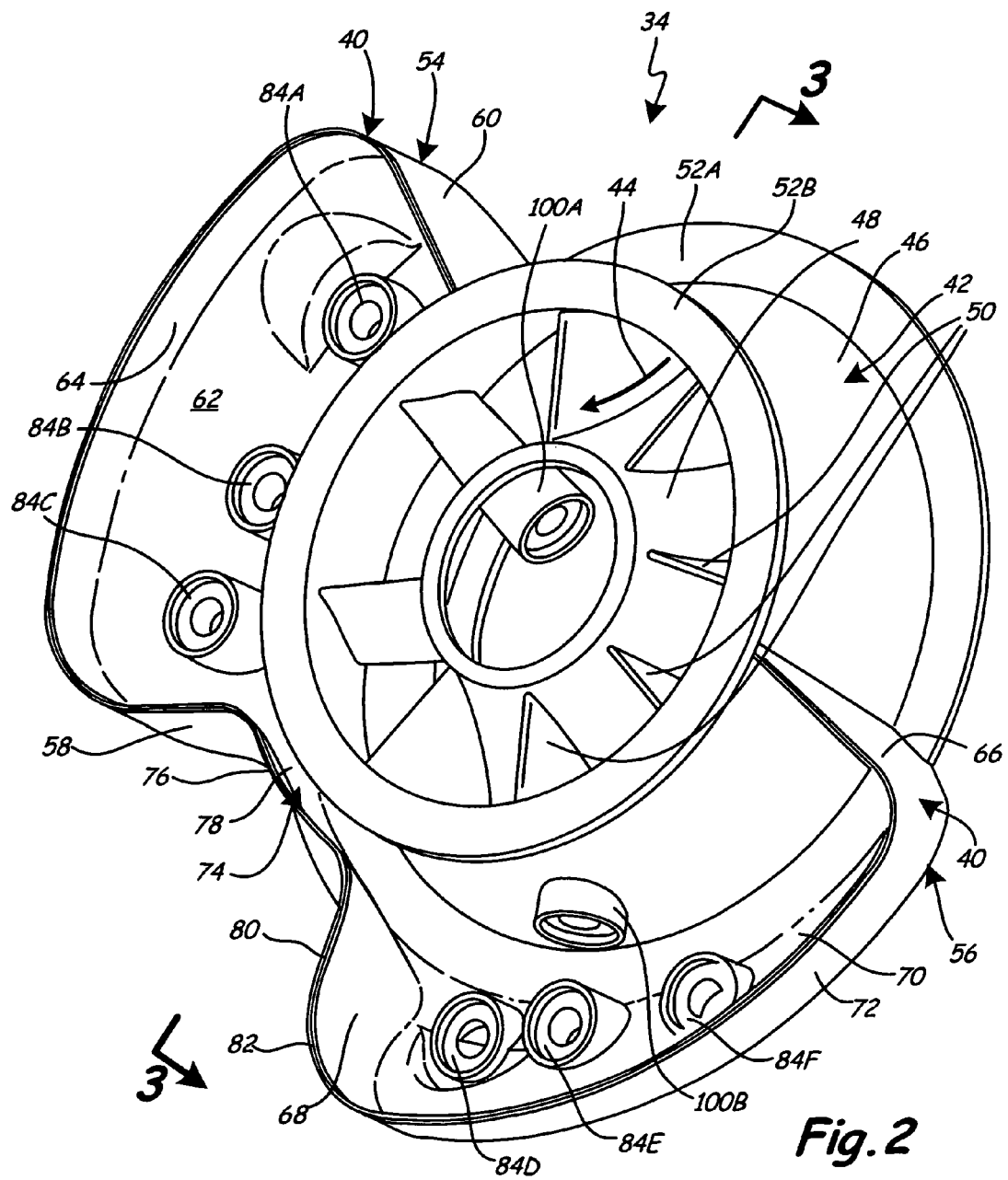
FIG. 2 is a rear perspective view of an intermediate case assembly having an integral gearbox.
Figure 3:
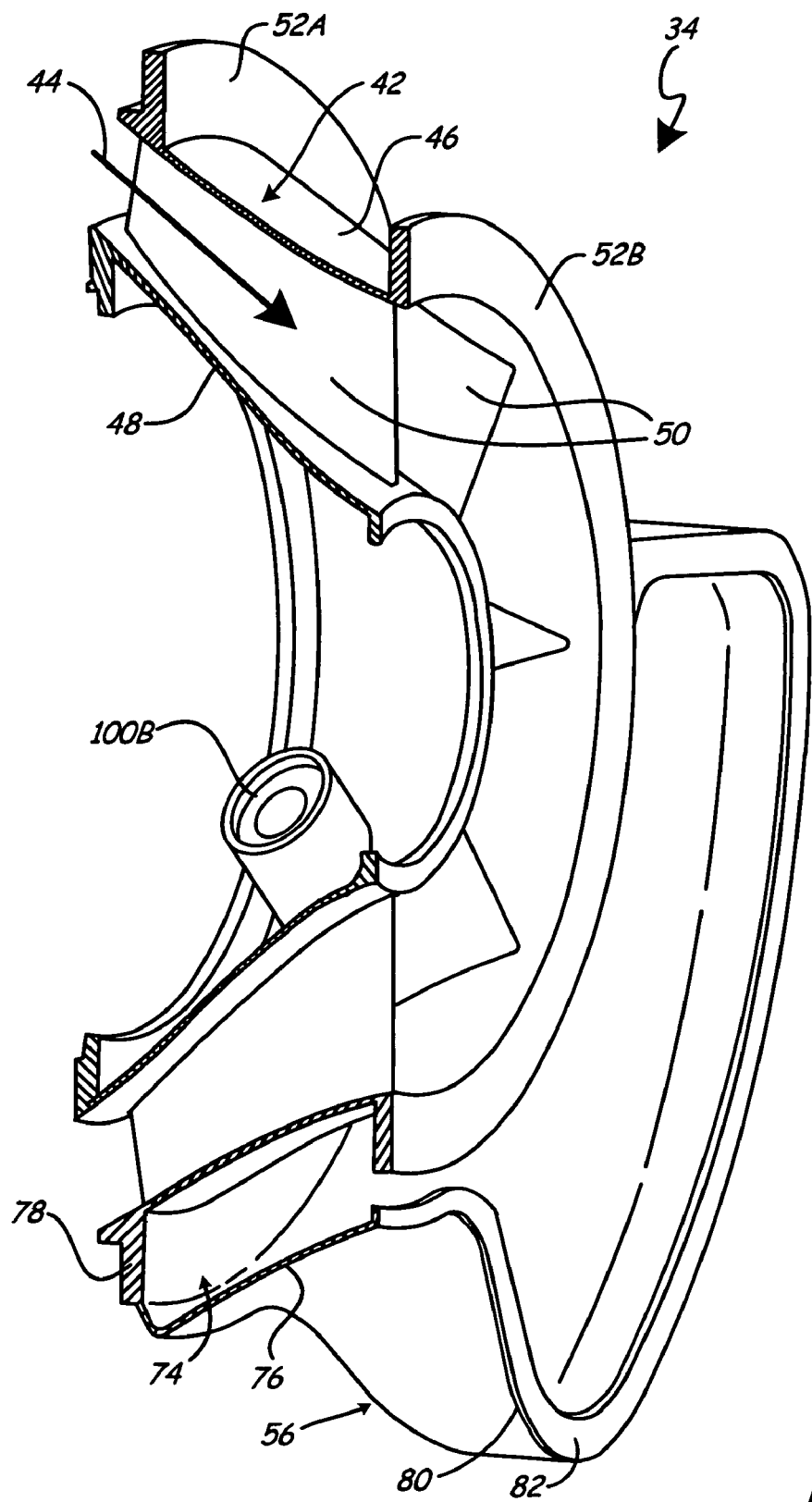
FIG. 3 is a sectional view of the intermediate case assembly taken along line 3-3 of FIG. 2.

FIG. 2 is a rear perspective view of intermediate case assembly 34, and FIG. 3 is a sectional view of intermediate case assembly 34 taken along line 3-3 of FIG. 2. FIG. 3 is shown with a different orientation than FIG. 2. As shown in FIGS. 2 and 3, intermediate case assembly 34 includes gearbox 40 integrally formed with transition duct 42. Transition duct 42 defines annular flowpath 44 between outer diameter boundary wall 46 and inner diameter boundary wall 48. Transition duct 42 is located between LPC 24 and HPC 26 with flowpath 44 defined therebetween. Outer diameter boundary wall 46 and inner diameter boundary wall 48 of transition duct 42 each have a substantially frusto-conical shape, with a greater diameter at a forward inlet region than an aft outlet region. Struts 50 are connected between outer diameter boundary wall 46 and inner diameter boundary wall 48. In the illustrated embodiment, eight struts 50 are equally spaced around transition duct 42 and have airfoil shapes that can turn fluid flow along flowpath 44. Outer diameter boundary wall 46 provides a shared wall where gearbox 40 is connected to transition duct 42. Outer diameter boundary wall 46 separates the interior cavity of gearbox 40 from flowpath 44.

Intermediate case assembly 34 has flanges 52A and 52B. Flanges 52A and 52B can include bolt holes (not shown) to attach intermediate case assembly 34 to gas turbine engine 20.

In the illustrated embodiment, gearbox 40 includes first lobe 54 and second lobe 56, which are angularly spaced from each other. First lobe 54 forms an internal cavity constrained by outer diameter boundary wall 46, gearbox sidewalls 58 and 60, gearbox front wall 62, and gearbox outer wall 64. First lobe 54 is shaped, to some extent, as a box with rounded corners between gearbox sidewalls 58 and 60 and gearbox outer wall 64. Gearbox outer wall 64 is curved so that all points along the surface of gearbox outer wall 64 are approximately equidistant from engine centerline $C_L$. Outer diameter boundary wall 46, gearbox sidewalls 58 and 60, gearbox front wall 62, and gearbox outer wall 64 can be formed integrally.

Second lobe 56 forms an internal cavity constrained by outer diameter boundary wall 46, gearbox sidewalls 66 and 68, gearbox front wall 70, and gearbox outer wall 72. Second lobe 56 is also shaped, to some extent, as a box with rounded corners between gearbox sidewalls 66 and 68 and gearbox outer wall 72. Gearbox outer wall 72 is curved so that all points along the surface of gearbox outer wall 72 are approximately equidistant from engine centerline $C_L$. The shape of second lobe 56 in the illustrated embodiment is approximately a mirror image of the shape of first lobe 54. Outer diameter boundary wall 46, gearbox sidewalls 66 and 68, gearbox front wall 70, and gearbox outer wall 72 can be formed integrally.

Connection passage 74 is an arc-shaped passage extending between first lobe 54 and second lobe 56. Connection passage 74 uses outer diameter boundary wall 46 of transition duct 42 as an inner wall. Connection passage outer wall 76 is connected to outer diameter boundary wall 46 by connection passage front wall 78. First lobe 54 is connected to connection passage 74 at side wall 58. Second lobe 56 is connected to connection passage 74 at side wall 68. Connection passage outer wall 76 is separated from outer diameter boundary wall 46 by a distance sufficient to allow a fluid, such as a lubricating oil, to flow freely. The fluid can be used to lubricate gears (not shown in FIGS. 2 and 3) in each lobe 54 and 56 during operation.

Connection passage 74 allows fluid to flow from first lobe 54 to second lobe 56 by way of gravity because of the substantially vertical orientation of connection passage 74 and due to the fact that gas turbine engine 20 is usually oriented close to horizontal, even during flight (the substantially vertical orientation is seen best in FIGS. 4 and 5 as described below). Connection passage 74 allows fluid to be scavenged by a single scavenge element (not shown in FIGS. 2 and 3) attached to second lobe 56. In alternative embodiments, connection passage 74 could be a detachable element, such as a pipe or hose connected between first and second lobes 54 and 56.

Gearbox 40 is uncovered as shown in FIGS. 2 and 3. Edge 80 runs continuously from first lobe 54 along connection passage 74 to second lobe 56 along the following walls in order: gearbox sidewall 60, gearbox outer wall 64, gearbox sidewall 58, connection passage outer wall 76, gearbox sidewall 68, gearbox outer wall 72, and gearbox sidewall 66. Gasket 82 is attached along edge 80 to provide sealing for attachment of a gearbox cover, described further, below.

First lobe 54 has mounting spaces 84A, 84B, and 84C and second lobe 56 has mounting spaces 84D, 84E, and 84F for mounting gears and accessories; gears and accessories are not shown in FIGS. 2 and 3 for simplicity. Forming gearbox 40 integrally with transition duct 42 improves the stiffness of both gearbox 40 and transition duct 42. Having more than one lobe further increases the stiffness of gearbox 40 because the interior cavities of each lobe 54 and 56 are smaller than a cavity would be with one large lobe to house a given set of accessories.

Figure 4:
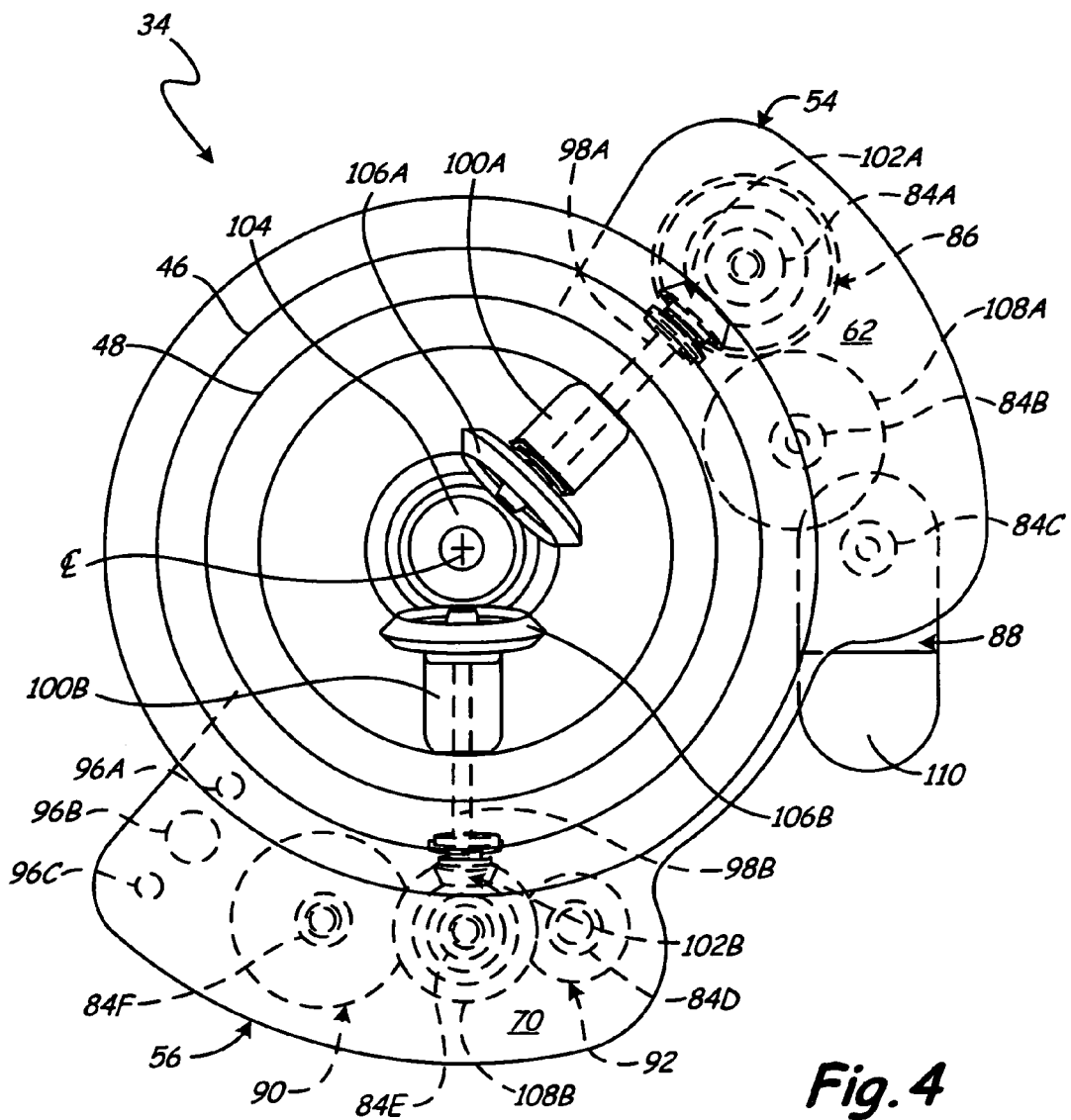
FIG. 4 is a front view of the intermediate case assembly of FIGS. 2 and 3.
Figure 5:
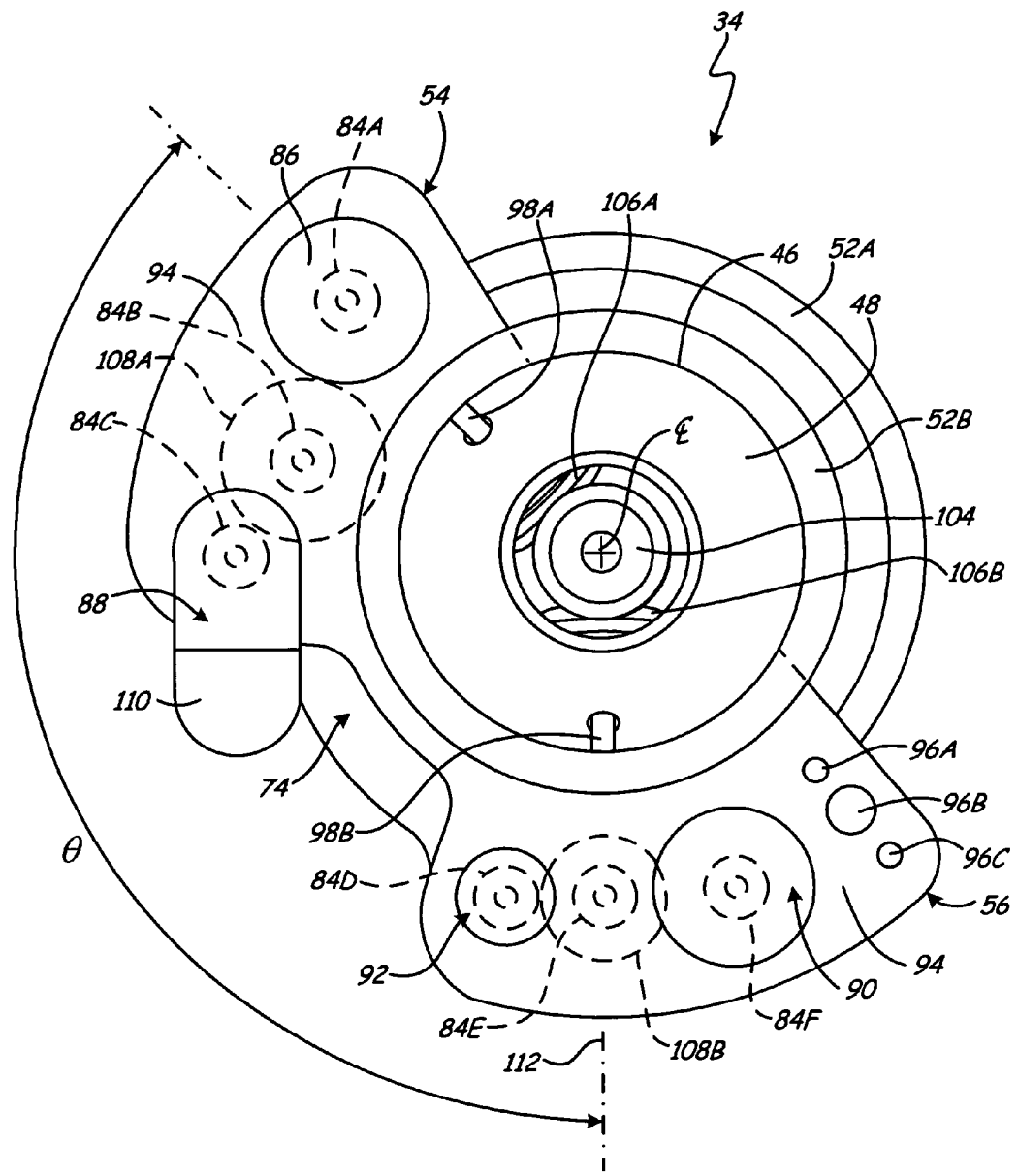
FIG. 5 is a rear view of the intermediate case assembly of FIGS. 2 and 3.

FIG. 4 is a front view and FIG. 5 is a rear view of intermediate case assembly 34 of FIGS. 2 and 3. Struts 50 are not shown in FIGS. 4 and 5 for simplicity. Air starter 86, generator 88, oil pump 90, and fuel pump 92 are shown in phantom on FIG. 4 behind gearbox front walls 70 and 62 and also on FIG. 5. Air starter 86, generator 88, oil pump 90, and fuel pump 92 all have portions on the outside of cover 94 and portions that extend through cover 94 into lobes 54 and 56. Air starter 86, generator 88, oil pump 90, and fuel pump 92 are shown schematically to show position. Outlets 96A, 96B, and 96C are holes through cover 94 that provide access to an oil storage tank (not shown).

Tower shafts 98A and 98B are surrounded by sleeves 100A and 100B, respectively. Sleeves 100A and 100B are each aligned with of one of several struts 50. Tower shafts 98A and 98B extend through one end of sleeves 100A and 100B, then extend through struts 50 as they cross flowpath 44, and finally pass through another end of sleeves 100A and 100B, respectively.

As shown in FIG. 4, certain gears of interconnected gear system 102A are mounted relative to mounting spaces 84A, 84B, and 84C. As shown in FIG. 5, air starter 86 and generator 88, are also mounted to mounting spaces 84A and 84C, respectively, and receive rotational input through interconnected gear system 102A. Compressor shaft 104 is operably coupled, via bevel gear 106A, with tower shaft 98A, which is coupled with gears for air starter 86, which is coupled with connector gear 108A, which is coupled with gears for generator 88.

As shown in FIG. 4, certain gears of interconnected gear system 102B are mounted relative to mounting spaces 84D, 84E, and 84F. As shown in FIG. 5, oil pump 90 and fuel pump 92 are also mounted to mounting spaces 84F and 84D, respectively, and receive rotational input through interconnected gear system 102B. Compressor shaft 104 is operably coupled, via bevel gear 106B, with tower shaft 98B, which is coupled with connector gear 108B, which is coupled with gears for oil pump 90 on a first side and gears for fuel pump 92 on a second side.

Particular accessories can have particular positioning requirements. Those accessories can be mounted to first lobe 54 or second lobe 56 as desired for particular applications. In one embodiment, a first set of accessories having similar power or speed requirements can be grouped together and mounted to first lobe 54 while a second set of accessories are grouped together and mounted to second lobe 56. In alternative embodiments, accessories and lobes can be located at other locations around intermediate case assembly 34 according to fluid plumbing constraints, proximity of other engine components, or ease of access.

In the illustrated embodiment, generator 88 is an accessory with an elongated or oblong shape and must be mounted in a substantially vertical position because dedicated generator oil tank 110 is located at a bottom of generator 88. If generator 88 were not mounted in a substantially vertical position, lubricant might not flow properly from generator 88 to generator oil tank 110 under gravity. Thus, it is beneficial for generator 88 to be mounted to first lobe 54 as shown in FIGS. 4 and 5 where first lobe 54 provides substantial space for a vertically oriented elongated accessory.

In the illustrated embodiment, oil pump 90 is mounted near bottom dead center position 112 of intermediate case assembly 34 because oil pump 90 uses gravity to return oil from various accessories and other components to oil pump 90. In alternative embodiments, oil pump 90 can be mounted in other mounting locations.

First lobe 54 and second lobe 56 are angularly spaced from each other by angle □ as measured between the respective tower shafts 98A and 98B. Tower shaft 98B is at bottom dead center position 112. In other embodiments, angle □ between first lobe 54 and second lobe 56 can be varied to accommodate accessory requirements or for other reasons.

Gearbox 40 can include one or more detachable portions to allow access to the internal cavities of lobes 54 and 56 for assembly, maintenance, etc. In the illustrated embodiment, cover 94 is a detachable portion of gearbox 40. As shown in FIG. 5, cover 94 comprises the aft wall of gearbox 40 located opposite front walls 70 and 72. FIGS. 2 and 3 show gearbox 40 without cover 94 and instead show an open side. In this embodiment, cover 94 closes gearbox 40 by connecting along edge 80. An interface between edge 80 and cover 94 can be sealed with gasket 82. In other embodiments, the detachable portion of gearbox 40 can vary in shape, size, or location. For example, there could be a single cover 94 for both lobes 54 and 56 or there could be separate covers 94 for each lobe 54 and 56. Having a detachable portion of gearbox 40 allows access to the interior cavities of each lobe 54 and 56 while maintaining a single shared wall with outer diameter boundary wall 46.

In the illustrated embodiment, gearbox 40 is formed integrally with transition duct 42 by casting gearbox 40 and transition duct 42 together as a single piece. In another embodiment, gearbox 40 is formed integrally with transition duct 42 by machining. In another embodiment, gearbox 40 is formed by casting gearbox 40 and transition duct 42 as a single piece and then machining. In yet another embodiment, a portion of gearbox 40 is manufactured separately from transition duct 42. For example, gearbox 40 could be formed separately from transition duct 42 and then welded together. Still other manufacturing methods may be used without departing from the actual invention. Intermediate case assembly 34 can comprise a metallic material, such as titanium. In another embodiment, intermediate case assembly 34 can comprise any material suitable for use in traditional gearboxes and transition ducts.

Having outer diameter boundary wall 46 as a single shared wall reduces overall weight because two separate walls are not required for transition duct 42 and gearbox 40. Forming gearbox 40 integrally with transition duct 42 allows for further weight reduction for gas turbine engine 20 because tower shafts 98A and 98B can be relatively short and the need for lay shafts can be eliminated. Additionally, the location of gearbox 40 allows it to operate in a relatively cool environment as opposed to being located closer to combustor assembly 28 toward the aft of gas turbine engine 20.

Although the present invention has been described with reference to preferred embodiments, workers skilled in the art will recognize that changes may be made in form and detail without departing from the spirit and scope of the invention. For example, the shape of the transition duct defined by the intermediate case assembly and the wall shared with the gearbox lobes can vary as desired for particular applications.

What is claimed is:

1. An assembly for a gas turbine engine, the assembly comprising:
    an intermediate case defining an annular transition duct; and
    a gearbox integrally formed with the annular transition duct, wherein the gearbox comprises a plurality of lobes, wherein the plurality of lobes are divided from each other by a side wall, the side wall extending from the annular transition duct substantially in a plane that extends in axial and radial directions relative to an engine centerline.

2. The assembly of claim 1, wherein the annular transition duct has a shared wall with the gearbox, the shared wall defining an outer diameter boundary of a flowpath through the annular transition duct.

3. The assembly of claim 2, wherein the shared wall has a substantially frusto-conical shape.

4. The assembly of claim 1, wherein the gearbox has a detachable portion.

5. The assembly of claim 4, wherein the detachable portion comprises a cover, and wherein an interface between the cover and another portion of the gearbox is sealed with a gasket.

6. The assembly of claim 1, wherein the gearbox comprises a connection passage between the plurality of lobes.

7. An assembly for a gas turbine engine, the assembly comprising:
    an intermediate case defining an annular transition duct; and
    a gearbox integrally formed with the annular transition duct, wherein the gearbox comprises a plurality of lobes, wherein each of the plurality of lobes comprises:
        a first side wall extending from the annular transition duct substantially in a first plane that extends in axial and radial directions relative to an engine centerline;
        a second side wall extending from the annular transition duct substantially in a second plane that extends in axial and radial directions relative to an engine centerline;
        a front wall extending from the annular transition duct substantially in a third plane that extends in angular and radial directions relative to an engine centerline;
        an aft wall extending from the annular transition duct substantially in a fourth plane that extends in angular and radial directions relative to an engine centerline; and
        an outer wall, connected to the first side wall, the second side wall, the front wall, and the aft wall, wherein the first side wall shares an edge with the front wall, which shares an edge with the second side wall, which shares an edge with the back wall, which shares an edge with the first side wall.

8. An assembly for a gas turbine engine, the assembly comprising:
    an intermediate case defining a transition duct;
    a gearbox having a shared wall with the transition duct, wherein the gearbox comprises a first lobe and a second lobe, wherein the first lobe and the second lobe are connected together in fluid communication by a connection passage;
    a first tower shaft powered by the gas turbine engine for providing rotational force input to the first lobe; and
    a second tower shaft powered by the gas turbine engine for providing rotational force input to the second lobe.

9. The assembly of claim 8, wherein the gearbox, the shared wall, and the transition duct are integrally formed.

10. The assembly of claim 8, wherein the connection passage is integrally formed with the first lobe and the second lobe.

11. The assembly of claim 8, wherein the connection passage is configured to transfer a fluid from the first lobe to the second lobe utilizing gravitational force.

12. The assembly of claim 8, wherein the first lobe defines a mounting space for mounting an elongated accessory in a substantially vertical position.

13. The assembly of claim 8, wherein the second lobe is located substantially at a bottom dead center position of the gas turbine engine relative to an engine centerline.

14. The assembly of claim 8, wherein the second lobe is angularly spaced from the first lobe about the engine centerline.

15. The assembly of claim 8, wherein the first lobe comprises:
    a first side wall extending from the annular transition duct substantially in a first plane that extends in axial and radial directions relative to an engine centerline;
    a second side wall extending from the annular transition duct substantially in a second plane that extends in axial and radial directions relative to an engine centerline;
    a front wall extending from the annular transition duct substantially in a third plane that extends in angular and radial directions relative to an engine centerline;
    an aft wall extending from the annular transition duct substantially in a fourth plane that extends in angular and radial directions relative to an engine centerline; and
    an outer wall, connected to the first side wall, the second side wall, the front wall, and the aft wall, wherein the first side wall shares an edge with the front wall, which shares an edge with the second side wall, which shares an edge with the back wall, which shares an edge with the first side wall.

16. An assembly for a gas turbine engine, the assembly comprising:
    an intermediate case defining a transition duct;
    a gearbox having a shared wall with the transition duct, wherein the gearbox comprises a first lobe and a second lobe, wherein the first lobe is divided from the second lobe by a side wall, the side wall extending from the annular transition duct substantially in a plane that extends in axial and radial directions relative to an engine centerline;

a first tower shaft powered by the gas turbine engine for providing rotational force input to the first lobe; and a second tower shaft powered by the gas turbine engine for providing rotational force input to the second lobe.

17. A method for housing gearing in a gas turbine engine, comprising steps of:

providing an intermediate case that includes a gearbox and a transition duct with a shared wall between the gearbox and the transition duct;

mounting a plurality of accessories at each of a first lobe and a second lobe of the gearbox; and linking the first lobe fluidically to the second lobe via a connection passage.

18. The method of claim 17, and further comprising the steps of:

mounting a first group of accessories each driven as a function of a first rotational input to the first lobe; and mounting a second group of accessories each driven as a function of a second rotational input to the second lobe.

19. The method of claim 17, comprising a further step of:

collecting fluid in the second lobe that has drained from the first lobe through the connection passage by way of gravity.

20. The method of claim 17, comprising a further step of:

integrally casting the gearbox with the transition duct.

21. An intermediate case assembly for a gas turbine engine, the assembly comprising:

a gearbox with a first lobe and a second lobe;

a connection passage linking the first lobe fluidically to the second lobe; and a transition duct sharing a wall with the gearbox.

22. The assembly of claim 21, wherein an accessory is mounted to the first lobe.

23. The assembly of claim 21, further comprising:

a first tower shaft;

a second tower shaft;

the first tower shaft extending into the first lobe; and the second tower shaft extending into the second lobe.

* * * * *

UNITED STATES PATENT AND TRADEMARK OFFICE
CERTIFICATE OF CORRECTION

| | | |
|---|---|---|
| PATENT NO. | : 8,192,143 B2 | Page 1 of 1 |
| APPLICATION NO. | : 12/154200 | |
| DATED | : June 5, 2012 | |
| INVENTOR(S) | : Gabriel L. Suciu, Brian D. Merry and Christopher M. Dye | |

It is certified that error appears in the above-identified patent and that said Letters Patent is hereby corrected as shown below:

Col. 2, Line 39
Delete "comers"
Insert --corners--

Col. 2, Line 49
Delete "comers"
Insert --corners--

Signed and Sealed this
Fourteenth Day of August, 2012

David J. Kappos
*Director of the United States Patent and Trademark Office*